(12) United States Patent
Mehta et al.

(10) Patent No.: US 8,994,224 B2
(45) Date of Patent: Mar. 31, 2015

(54) SOLAR ROOF SHINGLES AND UNDERLAYMENT WITH WIRELESS POWER TRANSFER

(75) Inventors: Vinay Mehta, Bridgewater, NJ (US); Adem Chich, Kearny, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 633 days.

(21) Appl. No.: 13/359,966

(22) Filed: Jan. 27, 2012

(65) Prior Publication Data

US 2013/0193769 A1    Aug. 1, 2013

(51) Int. Cl.
*H01F 38/00* (2006.01)
*H01L 31/042* (2014.01)
*H01L 31/048* (2014.01)
*F24J 2/04* (2006.01)

(52) U.S. Cl.
CPC ............ *H01F 38/00* (2013.01); *F24J 2/0455* (2013.01); *H01L 31/042* (2013.01); *H01L 31/0482* (2013.01); *H01L 31/0483* (2013.01)
USPC ........................................ 307/104; 52/173.3

(58) Field of Classification Search
CPC . H01F 38/00; H01L 31/0482; H01L 31/0483; H01L 31/042; F24J 2/0455
USPC ........................................ 307/104; 52/173.3
See application file for complete search history.

(56) References Cited

U.S. PATENT DOCUMENTS

| | | |
|---|---|---|
| 6,756,765 B2 | 6/2004 | Bruning |
| 7,068,991 B2 | 6/2006 | Parise |
| 7,443,057 B2 | 10/2008 | Nunally |
| 7,471,062 B2 | 12/2008 | Bruning |
| 7,514,899 B2 | 4/2009 | Deng-Peng |
| 7,880,337 B2 | 2/2011 | Farkas |
| 7,884,569 B2 | 2/2011 | Ward |
| 7,932,638 B2 | 4/2011 | Randall |
| 8,030,888 B2 | 10/2011 | Pandya et al. |
| 8,035,255 B2 | 10/2011 | Kurs et al. |

(Continued)

FOREIGN PATENT DOCUMENTS

JP    09 275644 A    10/1997

OTHER PUBLICATIONS

Adrian Covert, Japan Wants to Power 300,000 Homes with Wireless Energy from Space, www.popsci.com, Sep. 2, 2009.

(Continued)

*Primary Examiner* — Hal Kaplan
(74) *Attorney, Agent, or Firm* — Womble Carlyle Sandridge & Rice LLP

(57) ABSTRACT

A system of solar roof shingles and underlayment with wireless power transfer between the solar roof shingles and the underlayment is disclosed. Each roof shingle has a solar collector array coupled to a wireless resonator. The solar collector array establishes a voltage in response to exposure to sunlight and the wireless resonator converts the voltage to a transmittable electromagnetic signal. The signal is transmitted to resonant devices embedded in the underlayment beneath the shingles The resonant devices may be resonant capture devices that convert the received electromagnetic signal back to a usable voltage, or they may be wireless repeaters that retransmit the electromagnetic signal to remote resonant capture devices, which then convert it to a voltage. This voltage is placed on an electrical grid and made available at a remote location for use, storage, or placement on the public electrical grid.

21 Claims, 3 Drawing Sheets

(56) References Cited

U.S. PATENT DOCUMENTS

| | | |
|---|---|---|
| 8,106,539 B2 | 1/2012 | Schatz et al. |
| 8,115,448 B2 | 2/2012 | John |
| 8,621,813 B2 * | 1/2014 | Dube .............................. 52/518 |
| 2006/0238365 A1 | 10/2006 | Vecchione et al. |
| 2008/0157711 A1 | 7/2008 | Chiang et al. |
| 2009/0102296 A1 | 4/2009 | Greene et al. |
| 2009/0284245 A1 | 11/2009 | Kirby et al. |
| 2010/0084918 A1 | 4/2010 | Fells et al. |
| 2010/0176760 A1 | 7/2010 | Bullen |
| 2010/0187832 A1 | 7/2010 | Holland et al. |
| 2010/0201201 A1 | 8/2010 | Mobarhan et al. |
| 2010/0207572 A1 | 8/2010 | Kirby et al. |
| 2010/0223864 A1 | 9/2010 | Dube |
| 2010/0270967 A1 | 10/2010 | Cho et al. |
| 2011/0009824 A1 | 1/2011 | Yodfat et al. |
| 2011/0037322 A1 | 2/2011 | Kanno |
| 2011/0049992 A1 | 3/2011 | Sant'Anselmo et al. |
| 2011/0077809 A1 | 3/2011 | Leary |
| 2011/0080135 A1 | 4/2011 | Bland |
| 2011/0083718 A1 | 4/2011 | Wichner |
| 2011/0101788 A1 | 5/2011 | Sun et al. |
| 2011/0109259 A1 | 5/2011 | Choi et al. |
| 2011/0156494 A1 | 6/2011 | Mashinsky |
| 2011/0194277 A1 | 8/2011 | Yamaguchi |
| 2011/0199041 A1 | 8/2011 | Yang |
| 2011/0241603 A1 | 10/2011 | Chang et al. |
| 2011/0254377 A1 | 10/2011 | Wildmer et al. |
| 2011/0266882 A1 | 11/2011 | Yamamoto et al. |
| 2011/0308574 A1 | 12/2011 | Vaidyanathan |
| 2012/0001497 A1 | 1/2012 | Sada et al. |
| 2012/0007441 A1 | 1/2012 | John |
| 2012/0028538 A1 | 2/2012 | Wong |
| 2012/0031470 A1 | 2/2012 | Dimov et al. |
| 2012/0032522 A1 | 2/2012 | Schatz et al. |
| 2012/0041855 A1 | 2/2012 | Sterling et al. |
| 2012/0042588 A1 | 2/2012 | Erickson, Jr. |

OTHER PUBLICATIONS

Rajeev Bansal, The Future of Wireless Charging, IEEE Antennas and Propagation Magazine, vol. 51, No. 2, Apr. 2009, p. 153.

Solar Roof Tiles, www.reuk.co.uk, pp. 1-2.

Industry First: DOW™ POWERHOUSE™ Solar Shingle Protects and Powers the Home, www.building.dow.com, Jan. 19, 2010, pp. 1-3.

Peter Corke et al., Long-Duration Solar-powered Wireless Sensor Networks, pp. 33-37.

Nick Bilton, Charging Your Devices Through Solar Power, www.gadgetwise.blogs.nytimes.com, pp. 1-2.

[Security Show 2011] Panasonic Introduce Solar Table Concept with Wireless Power Transmission, www.en.akihabaranews.com, Mar. 10, 2011, pp. 1-3.

Ko Ko Win et al., Efficient Solar Energy Harvester for Wireless Sensor Nodes, IEEE, 2010, pp. 289-294.

W.S. Wang et al., Design Considerations of Sub-mW Indoor Light Energy Harvesting for Wireless Sensor Systems, ACM Journal on Emerging Technologies in Computing Systems, vol. 6, No. 2, Article 6, Jun. 2010, pp. 6:1-6:26.

Shinohara et al., "New Application of Microwave Power Transmission for Wireless Power Distribution System in Buildings", 978-1-4244-2642-3/08, 2008 IEEE, 4 pages.

International Search Report & Written Opinion—PCT/US2012/070611, Apr. 15, 2013, Building Materials Investment Corporation.

* cited by examiner

SOLAR ROOF SHINGLES AND UNDERLAYMENT WITH WIRELESS POWER TRANSFER

TECHNICAL FIELD

This disclosure relates generally to solar power and more specifically to solar shingles for shingling the roof of a structure and to the transfer of electrical power from the solar shingles to an electrical grid.

BACKGROUND

Solar panels installable on the roof of a home have been available for many years. In the past, these panels tended to be large and thick and were mounted above the traditional shingles of the roof on support structures. Such installations, while indeed contributing to a reduction in domestic electricity bills, were nevertheless considered by some to be unsightly and for this and other reasons, enjoyed limited success and acceptance, particularly in residential applications. Further, installation of such solar panels required specialized installers and substantial electrical expertise to wire the panels together into an electrical grid and to couple them to the home and to the public electrical service.

More recently, solar shingles have been developed as an alternative to roof mounted solar panels. These solar shingles are relatively thin, flexible, and mount to a roof in substantially the same way as traditional shingles. Therefore, they can be installed for the most part by roofing contractors. However, the shingles must still be electrically connected together by wires and connectors into an electrical grid that, in turn, delivers power ultimately to a home's electrical system through an inverter or inverters or other equipment. While solar shingles such as these represent an improvement over old roof mounted solar panels for domestic use, they nevertheless still require interconnection with a grid of wires. The interconnection itself can be quite complicated, requiring the services of skilled electricians. Furthermore, the wires and connectors used to interconnect the solar shingles can become unreliable or disconnected over time resulting in outages or efficiency reduction of the system as a whole.

Transferring electrical power generated by solar shingles without wired connections has been suggested. U.S. Pat. No. 8,035,255 of Kurs et al., for example, suggests the use of a disclosed wireless coupled resonator power transfer technology for this purpose. However, this references teaches that wireless capture resonator devices that couple with source resonators on the solar shingles be mounted inside the building beneath the roof. This approach would be labor intensive and would require specialized expertise and very precise location schemes to align the wireless capture devices in the attic with solar shingles on top of a roof, which are not visible from the attic. Repair or replacement of components also would be cumbersome and time consuming with such a solution. The Kurs et al. patent mentioned above is hereby incorporated fully by reference for its teaching of a wireless coupled resonator power transfer technology useful in the present invention.

A need therefore exists for a system and methodology for capturing electrical power generated by solar shingles that does not require that the shingles be interconnected in a wired electrical grid, that is installable by a roofing contractor without the requirement of special expertise, and that does not result in arrays of electrical equipment located in the attic space of a home. It is to the provision of a system and methodology that addresses this and other needs that the present invention is primarily directed.

SUMMARY

Briefly described, a solar shingle system includes, in one embodiment, an array of solar shingles mountable on the roof of a home or other structure. The solar shingles are installable by a traditional roofing contractor and may be generally configured similarly to any of a number of commercially available solar shingles. Unlike commercially available shingles, however, each shingle of the present invention is provided with a wireless resonator and may (or may not) also include a micro-inverter to convert the DC voltage established by the solar shingle to AC voltage.

An underlayment is disclosed for installation by the roofing contractor on a roof deck beneath where the solar shingles are to be installed. The underlayment provides traditional foundation and protection for overlying shingles, but also includes an array of resonant capture devices. The resonant capture devices may be arrayed to correspond to the arrangement of solar shingles to be installed atop the underlayment. Solar shingles are installed atop the underlayment with the resonators of the shingles aligned in a predetermined relationship relative to the resonant capture devices in the underlayment. Thus, electrical power generated by the solar shingles is transferred wirelessly to the resonant capture devices within the underlayment.

In one embodiment, the underlayment is formed with an integrated wired grid that couples the resonant capture devices within the underlayment together and delivers electrical power they generate to a central location for use, storage, or transmission. In another embodiment, resonant repeaters may be incorporated into the underlayment with the repeaters forming a wireless network for transferring power to one or more remotely located resonant capture devices. This embodiment avoids the wired grid within the underlayment.

It will thus be seen that an improved solar shingle system is disclosed that is significantly less complicated to install, does not require that a roofer connect a wiring grid to the shingles during installation, does not result in equipment inside the attic of a dwelling, and that generally requires only the skills of a traditional roofer. These and other features and advantages of the disclosed system and methodology will be better appreciated upon review of the detailed description presented below taken in conjunction with the accompanying drawing figures, which are briefly described as follows.

DETAILED DESCRIPTION

Figure 1:
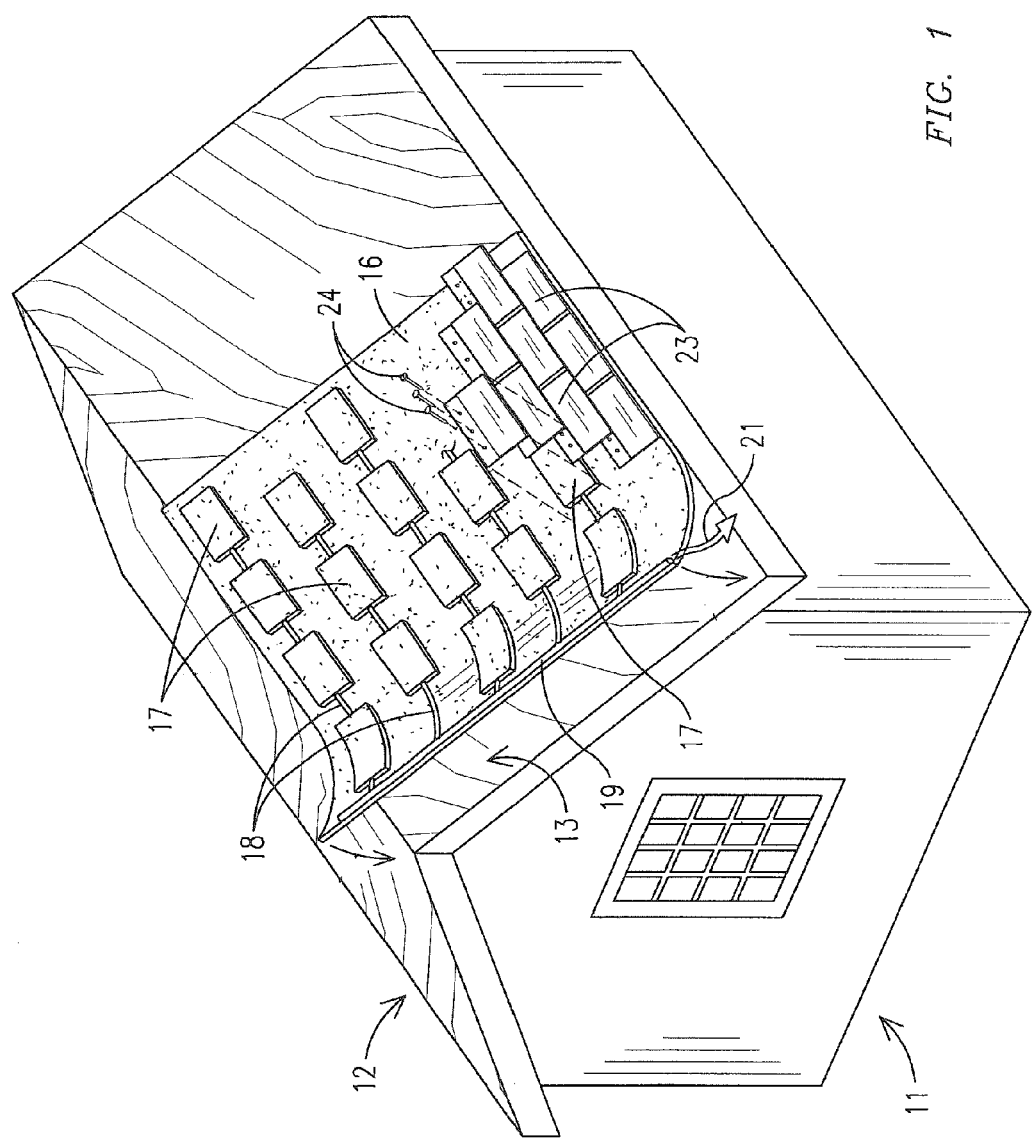
FIG. 1 is a perspective simplified view of a dwelling being provided with solar shingles and underlayment according one embodiment of the present disclosure.

Reference will now be made to the annexed drawing figures briefly described above. It should be appreciated that these figures are intended to be generic and to illustrate only exemplary embodiments of the present invention. Further, dimensions and relationships of features in the drawings may be exaggerated for clarity.

FIG. 1 shows a dwelling 11 having a roof 12 with a roof deck 13. The roof deck may be plywood or pressboard covering and secured to roof rafters in the attic space below. The dwelling 11 is intended to be provided with a solar power collection system covering at least a portion of the roof deck to collect solar radiation and convert the radiation to electrical power. To this end, an underlayment according to the invention is shown being laid atop the roof deck in the region to receive solar shingles. The underlayment is shown as a single sheet in FIG. 1, but it may be installed from rolls of substantially less width with upper sheets of the underlayment overlapping lower sheets. In this sense, the underlayment can be installed in a manner similar to traditional felt, polymer sheet, and other roofing underlayment materials and thus can be installed by general roofing contractors.

The underlayment of this embodiment includes an array of resonant capture devices 17. The resonant capture devices may be embedded within the material of the underlayment, sandwiched between two layers of sheet material, or affixed to the underside of the underlayment so that they are protected from the elements and maintained in a properly spaced array on the roof by the underlayment. Electrical wiring 18 may couple the resonant capture devices together and to an electrical bus 19, which also may be embedded within the material of the underlayment for similar purposes. In an embodiment described below, wireless resonant repeaters instead of resonant capture devices are integral to the underlayment and in such an embodiment, a wired grid may not be required. The underlayment may be made of a variety of materials including, for example, TPO, polyolefins, PET, EDPM, asphalt, saturated glass mat, or cellulosic felt paper or a combination of these. When installed on a roof, the underlayment establishes a spaced apart array of resonant capture devices. These resonant capture devices may be similar in operation to the devices disclosed in the incorporated patent of Kurs et al. or an equivalent technology. The details of these devices and their operation thus need not be described in great detail here.

In the illustrated embodiment, the resonant capture devices are shown electrically connected together and each row of capture devices is electrically connected to and electrical bus 19. The resonant capture devices may be wired in any suitable configuration such as, for example, in series, in parallel, or combinations thereof according to application specific parameters and/or the desired net voltage to be developed. The electrical voltage established by the resonant capture devices is applied to a wiring bus 19, which, in turn, directs it to a remote location for use, storage, or to be placed back on the public electrical grid.

In an alternate embodiment, the resonant capture devices in the underlayment are replaced with resonant repeaters. Such resonant repeaters are disclosed in the incorporated Kurs et al. patent and thus need not be described in detail here. Generally, however, such repeaters are resonantly tuned to wireless resonators but, instead of capturing electrical power from adjacent wireless resonators, repeaters act rather like a relay that re-transmits the received power wirelessly to one or more remotely located resonant capture devices. Thus, a wired electrical grid within the underlayment may not be required in this alternate embodiment. Further, the use of wireless repeaters may be economically more desirable than embedding multiple resonant capture devices and a wired grid within the underlayment. An array of wireless repeaters also allows for "voltage hopping" to and/or between resonant capture devices and, significantly. may allow for "network monitoring;" that is, being able to identify through monitoring in or associated with the resonant capture devices voltages being transferred by the individual repeaters. In this way, a potential underperforming and/or bad solar shingle or its wireless resonator may be localized so that it can be repaired or replaced as a regular maintenance activity.

With continued reference to FIG. 1, number of solar shingles 23 are shown installed and being installed atop the underlayment. These shingles may take on virtually any configuration; however, in the illustrated embodiment they are configured and installed generally as are solar shingles that are currently commercially available. These solar shingles are laid in courses in the same manner as traditional shingles and attached to the roof deck with nails 24 that are driven through the hidden flap of each shingle, through the underlayment, and into the roof deck. As illustrated in FIG. 1, the shingles 23 are installed in a predetermined aligned relationship with corresponding resonant capture devices 17 of the underlayment below. In the illustrated embodiment, each shingle 23 is aligned with a corresponding resonant capture device 17. However, other embodiments are possible wherein, for example, one resonant capture device might receive signals from two or more solar shingles so that configurations different from the one-to-one relationships shown in FIG. 1 are contemplated and within the scope of the invention.

As discussed in more detail below, each solar shingle is provided with a wireless resonator according to the incorporated Kurs et al. patent, or an equivalent technology, capable of transmitting electrical power wirelessly from the solar shingle to a corresponding resonant capture device or a corresponding wireless repeater device. Generally, this is accomplished by converting the voltage established by the solar shingles to a transmittable electromagnetic signal and transmitting this signal to a resonant capture device or a wireless repeater that is resonantly tuned to the wireless resonator.

Figure 2:
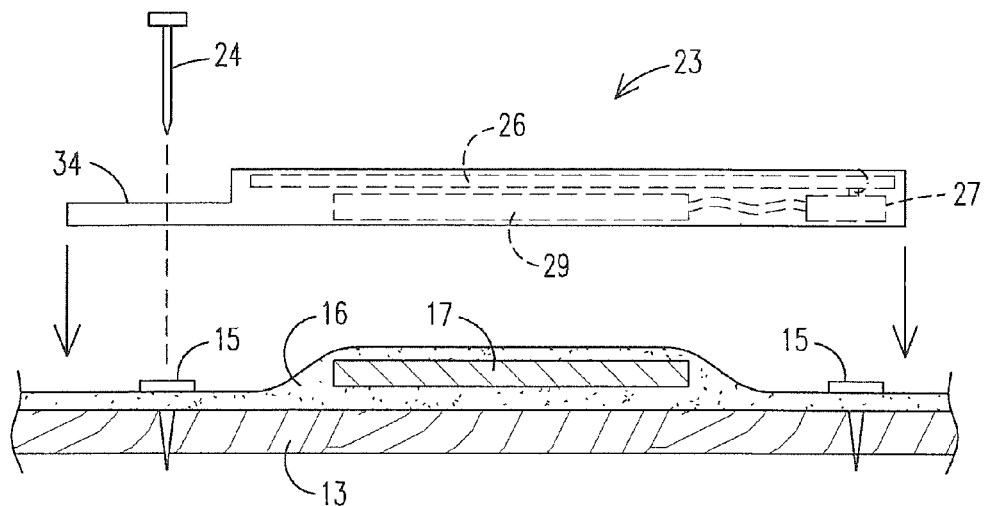
FIG. 2 is a side elevational view with dimensions exaggerated for clarity showing the underlayment with embedded wireless capture devices and/or resonant repeaters and a solar shingle having a wireless resonator and optional micro-inverter.

FIG. 2 illustrates in more detail one possible embodiment of an underlayment and solar shingle according to this disclosure. Relative dimensions and sizes may be exaggerated in FIG. 2 for clarity and ease of understanding. Further, the underlayment is described within the context of the embodiment wherein resonant capture devices are incorporated into the underlayment. However, the description applies generally to wireless repeaters rather than resonant capture devices in the underlayment.

The underlayment 16 is shown attached to the roof deck 13 with nails 15 or other appropriate fasteners. A resonant capture device 17 is illustrated in this embodiment as being embedded within the material of the underlayment as described above. The capture device also may be otherwise captured in the material of the underlayment if desired or affixed to the underside of the material of the underlayment. Regardless, the underlayment protects the resonant capture device and positions an array of devices in a properly spaced and array on the roof deck.

A solar shingle 23 is configured to be attached atop the roof covering a section of the underlayment 16. In this example, the solar shingle 23 is attached in a manner similar to standard shingles with nails 24 extending through a nailing flange 34, through the underlayment 16, and into the roof deck 13. Other solar shingle configurations and attachment techniques are available and/or possible and should be considered to be within the scope of the present invention. In general, however, the solar shingle 23 comprises a solar cell array 26 that is exposed to sunlight to establish an electrical voltage when the solar shingle is installed on the roof and illuminated. A wireless resonator 29 is mounted within the solar shingle 23 and is located to align in a predetermined relationship with a corresponding resonant capture device 17 of the underlayment below when the solar shingle is attached to the roof. In the illustrated embodiment, the wireless resonator 29 aligns in an overlying relationship with the resonant capture device. Such a relationship is not, however, a limitation of the invention and other alignment relationships may well be designed by the skilled artisan.

In the illustrated embodiment, the solar shingle also includes a micro-inverter 27 that is coupled to the DC voltage produced by the solar cell array 26, converts this DC voltage to an AC voltage, and directs the AC voltage to the wireless resonator 29. While this is one possible arrangement, it should be understood that the micro-inverter may be eliminated from each shingle with the voltage inversion being accomplished by a larger inverter in a location remote from the individual shingles. Micro-inversion at each shingle may be preferred in some situations because of cost, space, and efficiency considerations.

When the solar shingle 23 is installed and exposed to sunlight, the solar cell array produces a DC voltage. This voltage, which may be inverted to AC voltage, is delivered to the wireless resonator 29 and transmitted wirelessly thereby to the resonant capture device 17. The wiring grid within the underlayment in this embodiment interconnects the resonant capture devices 17 together electrically and delivers the electrical energy produced by all of them to a remote location. There, the electrical energy may be used to power household appliances, or may be stored in a battery bank or placed on the public electrical grid as desired.

As described above, the resonant capture devices as illustrated in FIG. 2 may be replaced with wireless repeaters. In such an embodiment, each wireless repeater transmits received electrical power wirelessly to one or more resonant capture devices, which may be remotely located. Such an embodiment may provide certain advantages including reduced cost, elimination of a wired grid in the underlayment, system monitoring capabilities, and others as described in more detail above.

Figure 3:
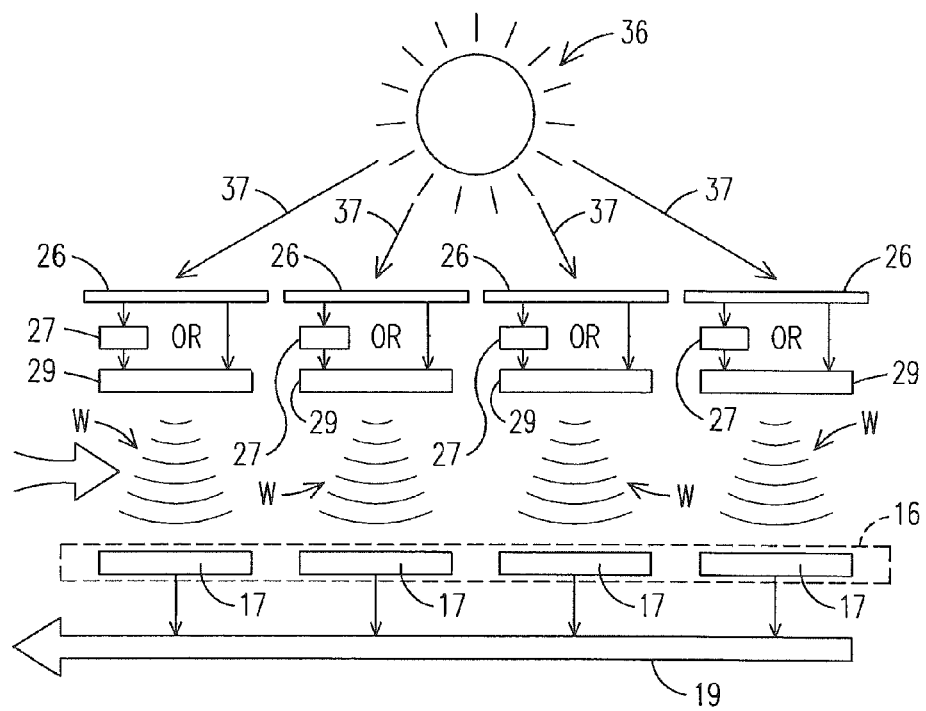
FIG. 3 is a schematic diagram illustrating one embodiment of interconnection relationships between the various components of the system of this disclosure.

FIG. 3 is a schematic illustration showing one embodiment of how the system of this invention might function in the field. The solar cell arrays 26 of the solar shingles are exposed to solar radiation 37 from the sun 36. In response, the solar cell arrays 26 generate or establish a DC voltage. This DC voltage can be converted to a corresponding AC voltage if desired using micro-inverters 27 located on each solar shingle or servicing two or more solar shingles. This AC voltage can then be coupled to the wireless resonator 29 of the solar shingle.

Alternatively, the DC voltage produced by the solar cell array 26 can be coupled directly to the wireless resonator 29 without being inverted by an inverter.

In response to a voltage from the solar cell array, the wireless resonator functions as described in detail in the incorporated Kurs et al. patent to convert the voltage to a transmittable electromagnetic signal W, which, in turn, is transmitted without a physical connection to and received by the corresponding resonant capture device 17. The resonant capture device 17, then, converts the wireless electromagnetic signal back to a voltage, which is added to the voltages generated by other resonant capture devices through an electrical grid 19. The voltage is then available on the grid to power appliances, to be stored, or to be placed on the public electric grid as desired.

Figure 4:
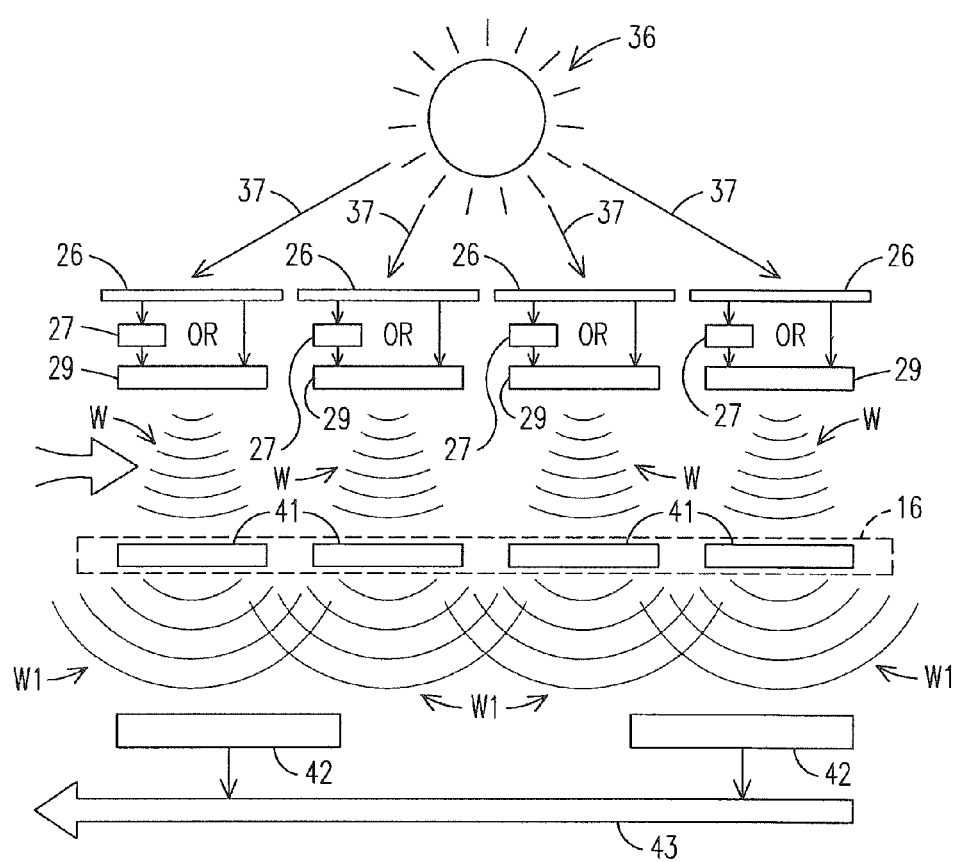
FIG. 4 is a schematic diagram illustrating an alternate embodiment of interconnection relationship between the various components in the depicted alternate embodiment.

FIG. 4 is a schematic illustration of the embodiment of this invention wherein wireless repeaters rather than resonant capture devices are embedded within the underlayment. As with the embodiment described above, the solar cell arrays 26 of the solar shingles are exposed to solar radiation 37 from the sun 36. In response, the solar cell arrays 26 generate or establish a DC voltage. This DC voltage can be converted to a corresponding AC voltage if desired using micro-inverters 27 located on each solar shingle or servicing two or more solar shingles. This AC voltage can then be coupled to the wireless resonator 29 of the solar shingle. Alternatively, the DC voltage produced by the solar cell array 26 can be coupled directly to the wireless resonator 29 without being inverted by an inverter.

In response to a voltage from the solar cell array, the wireless resonator functions as described in detail in the incorporated Kurs et al. patent to convert the voltage to a transmittable electromagnetic signal W, which, in turn, is transmitted without a physical connection to an array of resonant repeaters 41 embedded or otherwise incorporated into a sheet of underlayment 16. The resonant repeaters 41 then function as wireless relays that re-transmit wireless power W1 to one or more remotely located resonant capture devices 42. The capture devices capture and convert the received wireless power W1 back to a usable voltage and are connected to an electrical grid 43. The voltage is then available on the grid to power appliances, to be stored, or to be placed on the public electric grid as desired. In this embodiment, the wireless repeaters also may each transmit a unique identifier to the resonant capture devices. The capture devices can then be configured to monitor power received from each wireless repeater. In the event a repeater stops transmitting or transmits weak power, then the resonant capture device or devices can identify a problem in the system and notify individuals for inspection and/or repair.

The invention has been described herein in terms of preferred embodiments and methodologies considered to represent the best modes of carrying out the invention. It will be understood by the skilled artisan, however, that a wide variety of additions, deletions, and modifications, both subtle and gross, might well be made without departing from the spirit and scope of the invention.

What is claimed is:

1. A solar collection system for installation on the roof of a structure to convert sunlight to electrical energy and distribute the electrical energy to a remote location, the solar collection system comprising:
   an underlayment for installation on an area of the roof to be used for collecting sunlight;
   a plurality of resonant devices incorporated into the underlayment in a predetermined pattern;
   a plurality of solar collectors configured to be installed in an array on the roof overlying the underlayment;
   at least some of the solar collectors carrying a wireless resonator;
   the wireless resonators of the solar collectors aligning in a predetermined relationship with the resonant devices of the underlayment when the solar collectors are installed over the underlayment to transfer electrical power generated by the solar collectors to the resonant devices without physical connection.

2. The system of claim 1 and wherein the solar collectors comprise solar shingles.

3. The system of claim 1 further comprising inverters associated with each of the solar collectors for converting DC voltage developed by each solar collector to AC voltage that is coupled to the wireless resonator.

4. A solar collection system as claimed in claim 1 wherein the resonant devices incorporated into the underlayment comprise resonant capture devices.

5. A solar collection system as claimed in claim 4 further comprising a wiring grid incorporated into the underlayment electrically connecting the resonant capture devices for delivering electrical power from the resonant capture devices to a remote location.

6. A solar collection system as claimed in claim 5 wherein the wiring grid electrically connects the resonant capture devices in parallel, in series, or in a combination thereof.

7. A solar collection system as claimed in claim 6 and further comprising an electrical bus incorporated into the underlayment, the wiring grid being electrically connected to the electrical bus.

8. A solar collection system as claimed in claim 4 and wherein the resonant capture devices are aligned beneath corresponding solar collectors.

9. A solar collection system as claimed in claim 4 wherein the resonant capture devices are embedded within the material of the underlayment.

10. A solar collection system as claimed in claim 1 wherein the resonant devices comprise wireless repeaters.

11. A solar collection system as claimed in claim 10 further comprising at least one resonant capture device positioned to receive power wirelessly from one or more of the wireless repeaters of the underlayment and to convert the received power to usable electrical power.

12. A solar collection system as claimed in claim 11 wherein the at least one resonant capture device is located remotely from the wireless repeaters.

13. A solar collection system as claimed in claim 11 wherein the wireless repeaters are uniquely identifiable and wherein the system monitors the wireless repeaters and identifies wireless repeaters with signals that indicate a potential fault.

14. A solar collection system as claimed in claim 13 further comprising monitoring components in the one or more resonant capture devices that monitor the wireless repeaters.

15. A solar collection system as claimed in claim 13 further comprising an electrical bus coupled to the at least one resonant capture device for delivering electrical power from the at least one resonant capture device to a remote location.

16. A solar collection system as claimed in claim 1 further comprising electrical inverters associated with the wireless resonators for converting DC voltage established by the solar collectors to AC voltage.

17. A method comprising:
(a) allowing a solar collector on the roof of a building to be exposed to sunlight to establish a voltage;
(b) converting the voltage to a wirelessly transmittable electromagnetic signal;
(c) transmitting the electromagnetic signal wirelessly;
(d) receiving the transmitted electromagnetic signal through a resonant device incorporated into an underlayment beneath the solar collector;
(e) converting the received electromagnetic signal to a voltage; and
(f) conveying the converted voltage to a remote location for use.

18. The method of claim 17 wherein step (d) comprises receiving the transmitted electromagnetic signal through a resonant capture device.

19. The method of claim 17 wherein step (d) comprises receiving the transmitted electromagnetic signal through a wireless repeater in the underlayment.

20. The method of claim 19 and further comprising the step of retransmitting the electromagnetic signal with the wireless repeater to be received and converted to a voltage through a resonant capture device located remotely from the wireless repeater.

21. The method of claim 20 further comprising the step of inverting the voltage established in step (a) to an AC voltage prior to step (b).

* * * * *